(12) United States Patent
Wang et al.

(10) Patent No.: US 11,486,804 B1
(45) Date of Patent: Nov. 1, 2022

(54) DEVICE FOR SIMULATING FULL-SCALE PILE-SINKING PROCESS OF STATIC PRESSURE PILE BY AIR BAG PRELOADING AND TEST METHOD THEREOF

(71) Applicants: QINGDAO UNIVERSITY OF TECHNOLOGY, Qingdao (CN); Qingdao Green Technology Geotechnical Engineering Co., Ltd., Qingdao (CN); China State Construction Zhongxin Construction Engineering Co., Ltd. Shandong Branch, Qingdao (CN); Shandong Luqiao Group Co., Ltd., Jinan, China, Jinan (CN); Zhongji Jiurui Geotechnical Engineering Co., Ltd., Qingdao (CN)

(72) Inventors: Yonghong Wang, Qingdao (CN); Mingyi Zhang, Qingdao (CN); Jun Wang, Qingdao (CN); Bo Han, Qingdao (CN); Jiangbin Wu, Qingdao (CN); Chuantong Zhang, Qingdao (CN); Xiang Fang, Qingdao (CN); Yishun Jiang, Qingdao (CN); Yuning Ge, Qingdao (CN); Qijun Zhang, Qingdao (CN); Weihui Tian, Qingdao (CN); Yan Li, Qingdao (CN); Xun Zhu, Qingdao (CN); Baochang Zhang, Qingdao (CN); Guodong Shao, Qingdao (CN)

(73) Assignees: QINGDAO UNIVERSITY OF TECHNOLOGY, Qingdao (CN); Qingdao Green Technology Geotechnical Engineering Co., Ltd., Qingdao (CN); China State Construction Zhongxin Construction Engineering Co., Ltd. Shandong Branch, Qingdao (CN); Shandong Luqiao Group Co., Ltd., Jinan, China, Jinan (CN); Zhongji Jiurui Geotechnical Engineering Co., Ltd., Qingdao (CN)

( * ) Notice: Subject to any disclaimer, the term of this patent is extended or adjusted under 35 U.S.C. 154(b) by 0 days.

(21) Appl. No.: 17/846,945

(22) Filed: Jun. 22, 2022

(30) Foreign Application Priority Data

May 5, 2022 (CN) .......................... 202210479564.2

(51) Int. Cl.
  *G01N 3/12* (2006.01)
  *E02B 17/02* (2006.01)

(52) U.S. Cl.
  CPC ............ *G01N 3/12* (2013.01); *E02B 17/027* (2013.01); *G01N 2203/0048* (2013.01)

(58) Field of Classification Search
  CPC .. G01N 3/12; G01N 2203/0048; G01N 33/24; E02B 17/027; E02B 3/068;
  (Continued)

(56) References Cited

U.S. PATENT DOCUMENTS

| 1,272,479 A | 7/1918 | McBean |
| 3,861,156 A | 1/1975 | Uchida |

(Continued)

FOREIGN PATENT DOCUMENTS

| CN | 2809008 Y | 8/2006 | |
| CN | 103953079 A | * 7/2014 | |
| CN | 108487339 A | * 9/2018 | ............ E02D 33/00 |

*Primary Examiner* — Brandi N Hopkins

(57) ABSTRACT

Provided are a device for simulating a full-scale pile-sinking process of a static pressure pile by air bag preloading and a test method thereof. The device comprises a frame, a beam, a hydraulic jack, a model box, a model pile, a first sand layer, an undisturbed soil mass, a second sand layer, a rubber pad,
(Continued)

a forcing air bag, a counter-force steel plate, a model box top cover, a forcing pipe, a pressure relief pipe, a steel casing and a control system. The first sand layer, the undisturbed soil mass, the second sand layer, the rubber pad, the forcing air bag and the counter-force steel plate are laid in the model box in sequence; and the steel casing passes through the model box top cover, the counter-force steel plate, the forcing air bag and the rubber pad in sequence and then reaches a bottom portion of the second sand layer.

9 Claims, 3 Drawing Sheets

(58) Field of Classification Search
CPC ..... E02B 2017/0078; E02B 3/18; E02D 5/60; E02D 3/10; E02D 3/02; E02D 3/00; E02D 33/00; E02D 27/12; E02D 5/38; E02D 5/24; E02D 3/046; E02D 27/52; E02D 3/103; E02D 37/00; E02D 5/34; E02D 27/42; E02D 3/08; E02D 9/00; E02D 17/04; E02D 5/50; E02D 19/10; E02D 27/00; E02D 15/08; E02D 27/425; Y02E 10/72; E01C 3/00; E01C 3/04; Y02A 10/11; Y02W 30/80; B60R 21/232
See application file for complete search history.

(56) References Cited

U.S. PATENT DOCUMENTS

| | | |
|---|---|---|
| 4,285,237 A | 8/1981 | Romijn |
| 4,575,283 A | 3/1986 | Guandalini |
| 2018/0320335 A1* | 11/2018 | Jeon ................ E02D 27/425 |

* cited by examiner

DEVICE FOR SIMULATING FULL-SCALE PILE-SINKING PROCESS OF STATIC PRESSURE PILE BY AIR BAG PRELOADING AND TEST METHOD THEREOF

CROSS REFERENCE TO RELATED APPLICATIONS

This application claims foreign priority of Chinese Patent Application No. 202210479564.2, filed on May 5, 2022 in the China National Intellectual Property Administration, the disclosures of all of which are hereby incorporated by reference.

TECHNICAL FIELD

The present invention belongs to the technical field of pile foundation engineering, and more particularly, relates to a device for simulating a full-scale pile-sinking process of a static pressure pile by air bag preloading and a test method thereof.

BACKGROUND

With the rapid development of economy and the vigorous promotion of public infrastructure construction, pile foundation is widely used in foundation engineering, and has the advantages of high bearing capacity, good stability, small settlement and strong adaptability. A static pressing method is a common pile-sinking method in pile foundation engineering, and the static pressing method is a construction method that provides a pile pressing force by a static pile press to press a precast pile into soil. Compared with methods of hammering, vibration and water-flushing pile-sinking, the static pressing method is widely used in urban areas with high construction requirements due to no noise, no vibration, no environmental pollution and little impact on pile. However, a static pressure pile often has problems of a lifted pile body, a guide hole formed for pile pressing, and passing through a geological fault zone in a pile-sinking process, which are caused by the complicated stress of the pile body in a static pile pressing process. At present, theoretical studies on the static pressure pile are not comprehensive enough and it is necessary to further theoretically analyze an indoor model test of the static pressure pile. However, an influence of an upper layer soil weight on the pile body in the pile pressing process cannot be accurately simulated in the indoor test, which leads to the lack of accuracy and reliability of test results. Therefore, it is urgent to develop a model test device capable of simulating a full-scale pile-sinking process of the static pressure pile.

SUMMARY

The present invention aims to provide a test device for simulating full-scale pile-sinking indoors by air bag preloading and a test method thereof, which can simulate an influence of an upper layer soil weight on pile-sinking in a pile pressing process of a static pressure pile, and further study a pile-sinking mechanism of the static pressure pile.

The present invention provides a device for simulating a full-scale pile-sinking process of a static pressure pile by air bag preloading, which comprises a frame formed by surrounding a plurality of counter-force frames, a beam connected between adjacent counter-force frames, a hydraulic jack mounted on the beam, a model box located inside the frame, a model pile pressed by the hydraulic jack, a first sand layer, an undisturbed soil mass, a second sand layer, a rubber pad, a forcing air bag, a counter-force steel plate, a model box top cover covered on an upper surface of the model box, a forcing pipe and a pressure relief pipe which are both connected with the forcing air bag, a steel casing, and a control system connected with both the hydraulic jack and the forcing air bag, wherein the first sand layer, the undisturbed soil mass, the second sand layer, the rubber pad, the forcing air bag and the counter-force steel plate are laid in the model box in sequence; the steel casing passes through the model box top cover, the counter-force steel plate, the forcing air bag and the rubber pad in sequence and then reaches a bottom portion of the second sand layer; and the model pile is inserted into the steel casing to contact with a surface layer of the undisturbed soil mass.

Preferably, the beam is connected between adjacent counter-force frames through a guide sliding sleeve.

Preferably, two forcing pipes and two pressure relief pipes which are oppositely arranged and extend in opposite directions are both provided.

Preferably, the rubber pad, the forcing air bag, the counter-force steel plate and the model casing top cover are all provided with a pile position hole for the model pile to pass through.

Preferably, the counter-force steel plate and the model casing top cover are both provided with a forcing pipe position hole and a pressure relief pipe position hole for the forcing pipe and the pressure relief pipe to pass through respectively.

Preferably, the first sand layer and the second sand layer are both a sand layer with a thickness no less than 50 mm.

The present invention further provides a test method of the device for simulating the full-scale pile-sinking process of the static pressure pile by air bag preloading, which comprises the following steps of:

surrounding the plurality of counter-force frames to form the frame, slidably connecting the beam between adjacent counter-force frames, placing the model box in the frame, and fixing the hydraulic jack on the beam and positioning the hydraulic jack above the model box;

paving the first sand layer on the bottom portion of the model box firstly, then placing the undisturbed soil mass in the model box, and finally covering the second sand layer on the undisturbed soil mass;

covering the rubber pad, the forcing air bag and the counter-force steel plate on a surface of the second sand layer in sequence firstly, and then respectively penetrating the forcing pipe and the pressure relief pipe which are connected with the forcing air bag through the counter-force steel plate;

arranging the model box top cover on the model box, and respectively penetrating the forcing pipe and the pressure relief pipe through the model box top cover;

coating lubricating oil on an inner wall of the steel casing firstly, penetrating the steel casing through the model box top cover, the counter-force steel plate, the forcing air bag and the rubber pad in sequence to reach the bottom portion of the second sand layer; then grabbing the sand layer in the steel casing and avoiding disturbing the undisturbed soil mass below the second sand layer; and finally inserting the model pile into the steel casing to contact with the surface layer of the undisturbed soil mass; and connecting both the hydraulic jack and the forcing air bag with the control system, and controlling a pile pressing force and an upper layer soil weight in the pile-sinking process.

Preferably, the undisturbed soil mass is placed in the model box and avoided from being disturbed.

Preferably, the test method of the device for simulating the full-scale pile-sinking process of the static pressure pile by air bag preloading further comprises the step of: through multiple tests, simulating pile pressing processes at different depths by changing the undisturbed soil mass in the model box and a pressure of the forcing air bag, and finally simulating the whole pile pressing process by superimposing results of the multiple tests.

The present invention provides the device for simulating the pile-sinking process of the static pressure pile, and provides an effective method for simulating full-scale pile-sinking of the static pressure pile indoors, which simulates the upper layer soil weight by controlling an air pressure of the air bag, simulates the pile-sinking process of the static pressure pile more truly, and provides a test basis for further studying a pile-sinking mechanism of the static pressure pile.

DETAILED DESCRIPTION

To make the objects, the technical solutions and the advantages of the present invention clearer, the present invention is further described in detail hereinafter with reference to the drawings and the embodiments. It should be understood that the specific embodiments described herein are only used for explaining the present invention, and are not intended to limit the present invention.

The present invention discloses a test device for simulating full-scale pile-sinking indoors by air bag preloading, which can simulate an influence of an upper layer soil weight on pile-sinking in a pile pressing process of a static pressure pile, and further study a pile-sinking mechanism of the static pressure pile.

Figure 1:
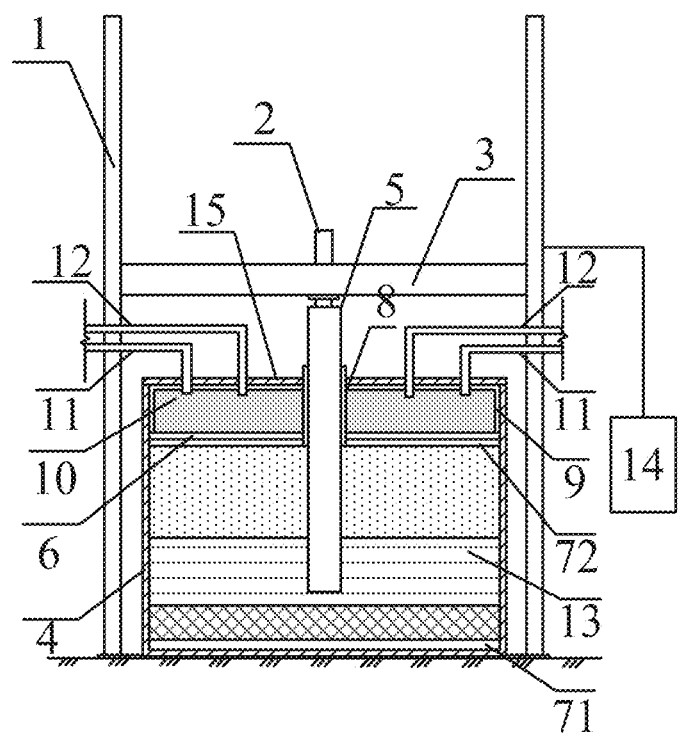
FIG. 1 is a cross-sectional view of a device for simulating a full-scale pile-sinking process of a static pressure pile by air bag preloading according to an embodiment of the present invention.
Figure 2:
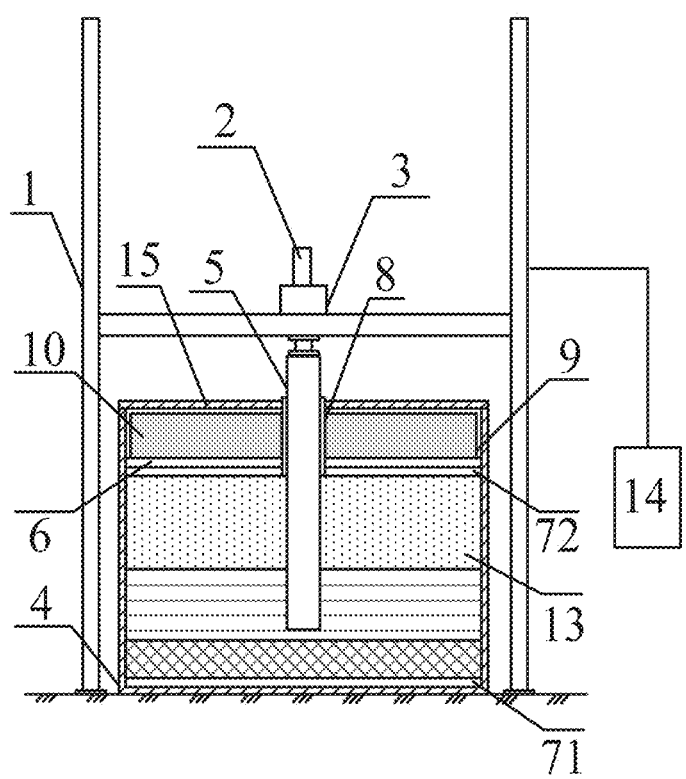
FIG. 2 is a cross-sectional view of the device for simulating the full-scale pile-sinking process of the static pressure pile by air bag preloading according to the embodiment of the present invention in a sunk state.
Figure 3:
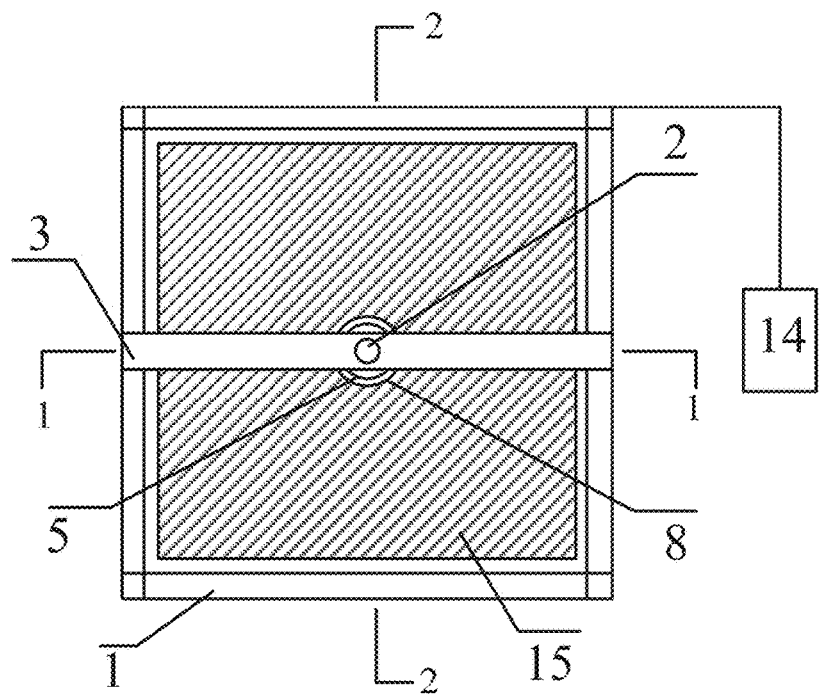
FIG. 3 is a top view of the device for simulating the full-scale pile-sinking process of the static pressure pile by air bag preloading according to the embodiment of the present invention.

As shown in FIG. 1 to FIG. 3, a device for simulating a full-scale pile-sinking process of a static pressure pile by air bag preloading according to the present invention comprises: a frame formed by surrounding a plurality of counter-force frames 1, a beam 3 connected between adjacent counter-force frames 1 through a guide sliding sleeve (not shown in the drawings), a hydraulic jack 2 mounted on the beam 3, a model box 4 formed by welding steel plates and located inside the frame, a model pile 5 pressed by the hydraulic jack 2, a first sand layer 71, an undisturbed soil mass 13, a second sand layer 72, a rubber pad 6, a forcing air bag 10, a counter-force steel plate 9, a model box top cover 15 covered on an upper surface of the model box 4, two forcing pipes 11 oppositely arranged and extending in opposite directions, two pressure relief pipes 12 oppositely arranged and extending in opposite directions, a steel casing 8, and a control system 14. The two forcing pipes 11 and the two pressure relief pipes 12 are both connected to the forcing air bag 10. The first sand layer 71, the undisturbed soil mass 13, the second sand layer 72, the rubber pad 6, the forcing air bag 10 and the counter-force steel plate 9 are laid in the model box 4 in sequence. The steel casing 8 passes through the model box top cover 15, the counter-force steel plate 9, the forcing air bag 10 and the rubber pad 6 in sequence and then reaches a bottom portion of the second sand layer 72. The model pile 5 is inserted into the steel casing 8 to contact with a surface layer of the undisturbed soil mass 13. The hydraulic jack 2 and the forcing air bag 10 are connected with the control system 14 to control a pile pressing force and an upper layer soil weight in the pile-sinking process.

Specifically, the first sand layer 71 with a certain thickness is paved on the bottom portion of the model box 4, the undisturbed soil mass 13 is laid on the first sand layer 71, and the second sand layer 72 with a certain thickness is covered on the undisturbed soil mass 13. The rubber pad 6 is covered on the second sand layer 72 and the forcing air bag 10 is covered on the rubber pad 6. The counter-force steel plate 9 is covered on the forcing air bag 10, and finally the model box top cover 15 is mounted on the model box 4. The hydraulic jack 2 and the forcing air bag 10 are connected with the control system 14 to control the pile pressing force and the pressure of the air bag in the pile (which is namely the model pile 5) sinking process.

Figure 4:
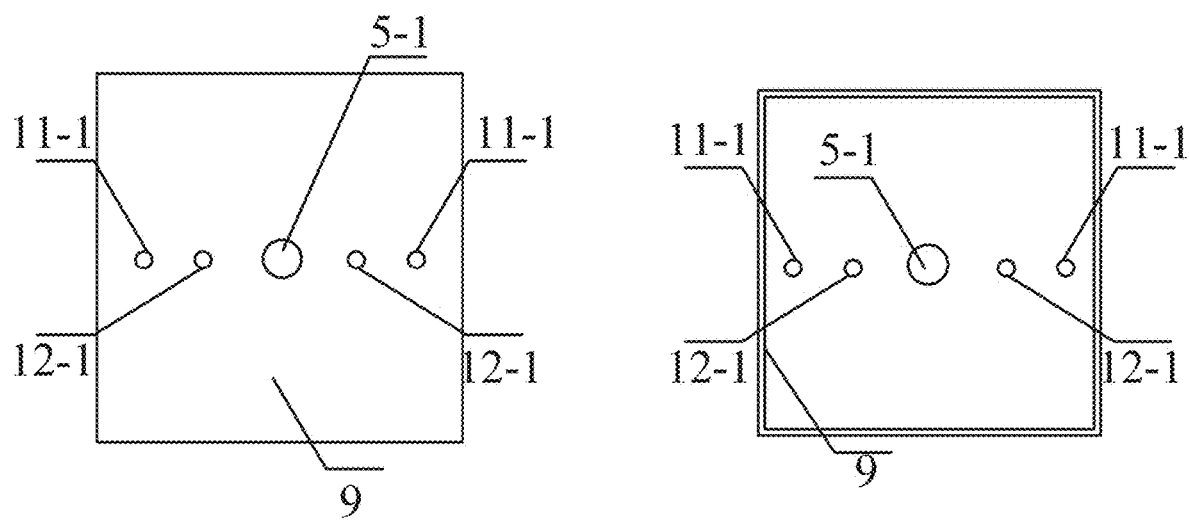
FIG. 4 is a top view of a counter-force steel plate of the device for simulating the full-scale pile-sinking process of the static pressure pile by air bag preloading according to the embodiment of the present invention.
Figure 5:
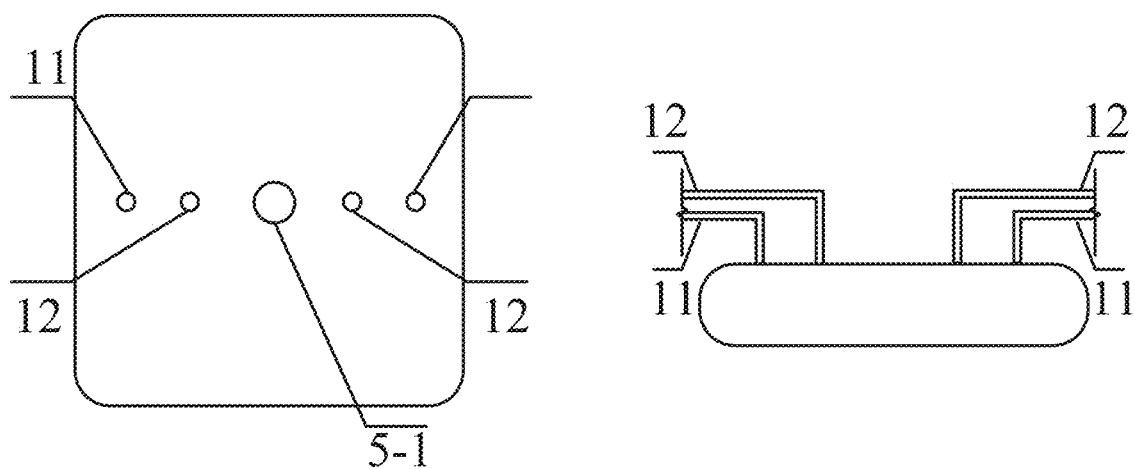
FIG. 5 is a schematic structural diagram of a forcing air bag of the device for simulating the full-scale pile-sinking process of the static pressure pile by air bag preloading according to the embodiment of the present invention.

As shown in FIG. 4, the rubber pad 6, the forcing air bag 10, the counter-force steel plate 9 and the model casing top cover 15 are all provided with a pile position hole 5-1 for the model pile 5 to pass through. The pile position hole 5-1 of the rubber pad 6, the pile position hole 5-1 of the forcing air bag 10, the pile position hole 5-1 of the counter-force steel plate 9 and the pile position hole 5-1 of the model box top cover 15 are all consistent in position and diameter.

The counter-force steel plate 9 and the model casing top cover 15 are both provided with a forcing pipe position hole 11-1 and a pressure relief pipe position hole 12-1 for the forcing pipe 11 and the pressure relief pipe 12 to pass through respectively. The forcing pipe position hole 11-1 of the counter-force steel plate 9 and the forcing pipe position hole 11-1 of the model box top cover 15 are both consistent in position and diameter, and the pressure relief pipe position hole 12-1 of the counter-force steel plate 9 and the pressure relief pipe position hole 12-1 of the model box top cover 15 are both consistent in position and diameter.

The counter-force frame 1 is formed by welding steel plates with a thickness of 5 mm, and a contour dimension of the frame formed by surrounding the plurality of counter-force frames 1 is at least 1,000 mm larger than that of the model box 4. The beam 3 is formed by welding steel plates with a thickness of 5 mm, a width and a height of the beam are no less than 200 mm, a length of the beam is the same as that of the counter-force frame 1, the beam 3 is connected with the counter-force frame 1 through the guide sliding sleeve, and the beam 3 may slide along the guide sliding sleeve and a guide rail. The hydraulic jack 2 is mounted on the beam 3, and a specification of the hydraulic jack is selected according to test requirements. The model box 4 is formed by welding steel plates with a thickness of 5 mm, and may be square or cylindrical in shape, and a dimension of the model box should be determined according to the test requirements. The model pile top cover 15 is a rigid steel plate. A dimension and a material of the model pile 5 depend on the test requirements. The steel casing 8 is a seamless steel pipe with a wall thickness of 5 mm, an inner diameter of the steel casing is slightly larger than a diameter of the model pile 5, a height of the steel casing is slightly larger than a thickness of the forcing air bag 10, and the steel casing may prevent the forcing air bag 10 from exerting an acting force on the model pile 5, thus affecting stress of a pile body. The counter-force steel plate 9 is a box-shaped bottomless guard plate formed by welding steel plates with a thickness of 5 mm, a length and a width of the counter-force steel plate are slightly smaller than those of the model box 4, a height of the counter-force steel plate is equal to the thickness of the forcing air bag 10, and the counter-force steel plate is used for limiting a displacement and a force exerting direction of the forcing air bag 10, so that the forcing air bag 10 exerts a vertical pressure on the undisturbed soil mass 13 in the model box 4. The rubber pad 6 is made of rubber, a length and a width of the rubber pad are slightly smaller than those of the model box 4, and a thickness of the rubber pad is no less than 10 mm. The first sand layer 71 and the second sand layer 72 are both a sand layer, and used for soil mass consolidation and drainage, and thicknesses of the first sand layer and the second sand layer are no less than 50 mm. The forcing air bag 10 is made of high-strength rubber, and a length and a width of the forcing air bag are slightly smaller than those of the model box 4, the thickness of the forcing air bag is no less than 30 mm, an upper portion of the forcing air bag 10 is connected with the forcing pipe 11 and the pressure relief pipe 12, and different upper layer soil weights are simulated by controlling the air pressure in the forcing air bag 10. The forcing pipe 11 and the pressure relief pipe 12 are high-strength rubber hoses, and diameters of the forcing pipe and the pressure relief pipe are 30 mm. The control system 14 controls the pressure of the forcing air bag 10 and movement and loading of the hydraulic jack 2 through a computer. Through multiple tests, pile pressing processes at different depths are simulated by changing the undisturbed soil mass 13 in the model box 4 and the pressure of the forcing air bag 10, and finally the whole pile pressing process is simulated by superimposing results of the multiple tests.

In the embodiment, the counter-force frame 1 is formed by welding I-shaped steel with a thickness of 5 mm, and the contour dimension of the frame formed by surrounding the plurality of counter-force frames 1 is 3,000 mm×3,000 mm×5,000 mm. The hydraulic jack 2 is an electro-hydraulic servo jack of 0 ton to 100 tons controlled by a computer. The beam 3 is formed by welding I-shaped steel with a thickness of 5 mm, and a dimension of the beam is 3,000 mm×3,000 mm×400 mm. The model box 4 is formed by welding steel plates with a thickness of 5 mm, and a dimension of the model box is 2,000 mm×2,000 mm×2,000 mm.

Diameters of the forcing pipe position hole 11-1 and the pressure relief pipe position hole 12-1 of the model box top cover 15 are 35 mm, and the forcing pipe position hole 11-1 and the pressure relief pipe position hole 12-1 of the model box top cover 15 are both located on a connecting line of middle points of a set of opposite sides. A distance between the forcing pipe position hole 11-1 of the model box top cover 15 and an outer edge of the model box top cover 15 is 500 mm, and a distance between the pressure relief pipe position hole 12-1 of the model box top cover 15 and the outer edge of the model box top cover 15 is 800 mm.

A diameter of the pile position hole 5-1 of the model pile 5 is 80 mm, and the pile position hole is located in a center of the model pile 5. The model pile 5 is made of concrete, a diameter of the model pile is 60 mm and a length of the model pile is 1,000 mm, and various test sensors are mounted on the model pile. The steel casing 8 is the seamless steel pipe with the wall thickness of 10 mm, an inner diameter of the steel casing is 65 mm and a height of the steel casing is 230 mm, and the steel casing prevents the forcing air bag 10 from exerting an acting force on the model pile 5.

The rubber pad 6 is made of rubber, a dimension of the rubber pad is 1,900 mm×1,900 mm and a thickness of the rubber pad is 10 mm. The first sand layer 71 and the second sand layer 72 are the sand layers and used for consolidation and drainage of the undisturbed soil mass 13, and thicknesses of the first sand layer and the second sand layer are 30 mm. The counter-force steel plate 9 is the box-shaped bottomless guard plate formed by welding steel plates with a thickness of 5 mm, a dimension of the counter-force steel plate is 1,900 mm×1,900 mm×200 mm, and the counter-force steel plate may limit the displacement and the force exerting direction of the forcing air bag 10, so that the forcing air bag 10 exerts a vertical pressure on the undisturbed soil mass 13 in the model box 4.

The forcing air bag 10 is made of high-strength rubber, and a dimension of the forcing air bag is 1,900 mm×1,900 mm×200 mm. The forcing pipe 11 and the pressure relief pipe 12 are the high-strength rubber hoses, and diameters of the forcing pipe and the pressure relief pipe are 30 mm.

The pressure of the forcing air bag 10 and the movement and the loading of the hydraulic jack 2 are controlled by the control system 14.

Through multiple tests, the pile pressing processes at different depths are simulated by changing the undisturbed soil in the model box 4 and the pressure of the forcing air bag, and finally the whole pile pressing process is simulated by superimposing results of the multiple tests.

The present invention further provides a test method for simulating full-scale pile-sinking of the static pressure pile by air bag preloading, which comprises the following steps of:

S1: surrounding the plurality of counter-force frames 1 to form the frame, slidably connecting the beam 3 between adjacent counter-force frames 1, placing the model box 4 in the frame, and fixing the hydraulic jack 2 on the beam 3 and positioning the hydraulic jack above the model box 4;

S2: paving the first sand layer 71 on the bottom portion of the model box 4 firstly, then placing the undisturbed soil mass 13 in the model box 4 slowly to avoid disturbance, and finally covering the second sand layer 72 on the undisturbed soil mass 13 for consolidation and drainage of the undisturbed soil mass 13;

S3: covering the rubber pad 6, the forcing air bag 10 and the counter-force steel plate 9 on a surface of the second sand layer 72 in sequence firstly, and then respectively penetrating the forcing pipe 11 and the pressure relief pipe 12 which are connected with the forcing air bag 10 through the forcing pipe position hole 11-1 and the pressure relief pipe position hole 12-1 in the counter-force steel plate 9;

S4: arranging the model box top cover 15 on the model box 4, and respectively penetrating the forcing pipe 11 and the pressure relief pipe 12 through the forcing pipe position hole 11-1 and the pressure relief pipe position hole 12-1 in the model box top cover 15;

S5: coating lubricating oil such as vaseline on an inner wall of the steel casing 8 firstly, penetrating the steel casing 8 through the pile position hole 5-1 of the model box top cover 15, the pile position hole 5-1 of the counter-force steel plate 9, the pile position hole 5-1 of the forcing air bag 10 and the pile position hole 5-1 of the rubber pad 6 in sequence to reach the bottom portion of the second sand layer 72; then grabbing the sand layer in the steel casing 8 with a tool slowly and avoiding disturbing the undisturbed soil mass 13 below the second sand layer 72; and finally inserting the model pile 5 into the steel casing 8 to contact with the surface layer of the undisturbed soil mass 13;

S6: connecting both the hydraulic jack 2 and the forcing air bag 10 with the control system 14, and controlling a pile pressing force and an upper layer soil weight in the pile-sinking process; and S7: through multiple tests, simulating pile pressing processes at different depths by changing the undisturbed soil mass in the model box 4 and a pressure of the forcing air bag 10, and finally simulating the whole pile pressing process by superimposing results of the multiple tests.

The present invention provides the device for simulating the pile-sinking process of the static pressure pile, and provides an effective method for simulating full-scale pile-sinking of the static pressure pile indoors, which simulates the upper layer soil weight by controlling the air pressure of the air bag, simulates the pile-sinking process of the static pressure pile more truly, and provides a test basis for further studying a pile-sinking mechanism of the static pressure pile.

The description above is only the preferred embodiments of the present invention, and is not intended to limit the present invention in any form. Although the present invention has been disclosed by the preferred embodiments above, the preferred embodiments are not intended to limit the present invention. Those skilled in the art can make some changes or modifications as equivalent embodiments with equivalent changes by using the technical contents disclosed above without departing from the scope of the technical solutions of the present invention. However, for the contents not departing from the scope of the technical solutions of the present invention, any simple amendments, equivalent changes and modifications made to the above embodiments according to the technical essence of the present invention are still included in the scope of the technical solutions of the present invention.

The invention claimed is:

1. A device for simulating a full-scale pile-sinking process of a static pressure pile by air bag preloading, comprising a frame formed by surrounding a plurality of counter-force frames (1), a beam (3) connected between adjacent counter-force frames (1), a hydraulic jack (2) mounted on the beam (3), a model box (4) located inside the frame, a model pile (5) pressed by the hydraulic jack (2), a first sand layer (71), an undisturbed soil mass (13), a second sand layer (72), a rubber pad (6), a forcing air bag (10), a counter-force steel plate (9), a model box top cover (15) covered on an upper surface of the model box (4), a forcing pipe (11) and a pressure relief pipe (12) which are both connected with the forcing air bag (10), a steel casing (8), and a control system (14) connected with both the hydraulic jack (2) and the forcing air bag (10), wherein the first sand layer (71), the undisturbed soil mass (13), the second sand layer (72), the rubber pad (6), the forcing air bag (10) and the counter-force steel plate (9) are laid in the model box (4) in sequence; the steel casing (8) passes through the model box top cover (15), the counter-force steel plate (9), the forcing air bag (10) and the rubber pad (6) in sequence and then reaches a bottom portion of the second sand layer (72); and the model pile (5) is inserted into the steel casing (8) to contact with a surface layer of the undisturbed soil mass (13).

2. The device for simulating the full-scale pile-sinking process of the static pressure pile by air bag preloading according to claim 1, wherein the beam (3) is connected between adjacent counter-force frames (1) through a guide sliding sleeve.

3. The device for simulating the full-scale pile-sinking process of the static pressure pile by air bag preloading according to claim 1, wherein two forcing pipes (11) and two pressure relief pipes (12) which are oppositely arranged and extend in opposite directions are both provided.

4. The device for simulating the full-scale pile-sinking process of the static pressure pile by air bag preloading according to claim 1, wherein the rubber pad (6), the forcing air bag (10), the counter-force steel plate (9) and the model casing top cover (15) are all provided with a pile position hole (5-1) for the model pile (5) to pass through.

5. The device for simulating the full-scale pile-sinking process of the static pressure pile by air bag preloading according to claim 1, wherein the counter-force steel plate (9) and the model casing top cover (15) are both provided with a forcing pipe position hole (11-1) and a pressure relief pipe position hole (12-1) for the forcing pipe (11) and the pressure relief pipe (12) to pass through respectively.

6. The device for simulating the full-scale pile-sinking process of the static pressure pile by air bag preloading according to claim 1, wherein the first sand layer (71) and the second sand layer (72) are both a sand layer with a thickness no less than 50 mm.

7. A test method of the device for simulating the full-scale pile-sinking process of the static pressure pile by air bag preloading according to claim, comprising the following steps of:

surrounding the plurality of counter-force frames (1) to form the frame, slidably connecting the beam (3) between adjacent counter-force frames (1), placing the model box (4) in the frame, and fixing the hydraulic jack (2) on the beam (3) and positioning the hydraulic jack above the model box (4);

paving the first sand layer (71) on the bottom portion of the model box (4) firstly, then placing the undisturbed soil mass (13) in the model box (4), and finally covering the second sand layer (72) on the undisturbed soil mass (13);

covering the rubber pad (6), the forcing air bag (10) and the counter-force steel plate (9) on a surface of the second sand layer (72) in sequence firstly, and then respectively penetrating the forcing pipe (11) and the pressure relief pipe (12) which are connected with the forcing air bag (10) through the counter-force steel plate (9);

arranging the model box top cover (15) on the model box (4), and respectively penetrating the forcing pipe (11) and the pressure relief pipe (12) through the model box top cover (15);

coating lubricating oil on an inner wall of the steel casing (8) firstly, penetrating the steel casing (8) through the model box top cover (15), the counter-force steel plate (9), the forcing air bag (10) and the rubber pad (6) in sequence to reach the bottom portion of the second sand layer (72); then grabbing the sand layer in the steel casing (8) and avoiding disturbing the undisturbed soil mass (13) below the second sand layer (72); and finally inserting the model pile (5) into the steel casing (8) to contact with the surface layer of the undisturbed soil mass (13); and connecting both the hydraulic jack (2) and the forcing air bag (10) with the control system (14), and controlling a pile pressing force and an upper layer soil weight in the pile-sinking process.

8. The test method of the device for simulating the full-scale pile-sinking process of the static pressure pile by air bag preloading according to claim 7, wherein the undisturbed soil mass (13) is placed in the model box (4) and avoided from being disturbed.

9. The test method of the device for simulating the full-scale pile-sinking process of the static pressure pile by air bag preloading according to claim 7, further comprising the step of: through multiple tests, simulating pile pressing processes at different depths by changing the undisturbed soil mass in the model box (4) and a pressure of the forcing air bag (10), and finally simulating the whole pile pressing process by superimposing results of the multiple tests.

\* \* \* \* \*